(12) United States Patent
McGuire et al.

(10) Patent No.: US 11,424,960 B1
(45) Date of Patent: Aug. 23, 2022

(54) EXPONENTIAL SCALING FOR WIRELESS ROAMING EVENTS IN FACILITIES

(71) Applicant: Amazon Technologies, Inc., Seattle, WA (US)

(72) Inventors: Christopher S McGuire, Liberty Hill, TX (US); Sreenivasa Kaki, Apex, NC (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/196,415

(22) Filed: Mar. 9, 2021

(51) Int. Cl.
*H04L 12/46* (2006.01)
*H04W 8/02* (2009.01)

(52) U.S. Cl.
CPC ...... *H04L 12/4641* (2013.01); *H04L 12/4633* (2013.01); *H04W 8/02* (2013.01)

(58) Field of Classification Search
None
See application file for complete search history.

(56) References Cited

U.S. PATENT DOCUMENTS

2021/0036928 A1* 2/2021 Narayanan ............ H04W 16/18

* cited by examiner

*Primary Examiner* — Christine T Duong
(74) *Attorney, Agent, or Firm* — Kilpatrick Townsend & Stockton LLP

(57) ABSTRACT

Techniques for a scalable wireless network feature for maintaining communications between wireless devices accessing a facility are described herein. A virtual partition for each wireless virtual local area network (VLAN) of a plurality of VLANs may be maintained. A virtual partition is configured to process mapping requests from one or more wireless devices of a particular VLAN of the VLANs. A threshold may be maintained that is associated with roaming per second events by the one or more wireless devices of the facility. A new virtual partition for a new VLAN may be instantiated based on information from the one or more wireless devices indicating that the roaming per second events exceed the threshold. One or more components of an intermediate distribution frame may be updated with mapping data to utilize with new wireless devices accessing the facility and for communicating with the new virtual partition for the new VLAN.

20 Claims, 8 Drawing Sheets

EXPONENTIAL SCALING FOR WIRELESS ROAMING EVENTS IN FACILITIES

BACKGROUND

Modern facilities, such as mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and wireless network architecture, can result in lower throughput, unacceptably long response times, an ever-increasing backlog of unfinished tasks, and, in general, poor system performance. Network engineers are increasingly interested in analyzing how wireless network activity performs relative to the floor layout of modern facilities. Currently many conventional wireless network architectures for facilities utilize vertical scaling solutions which quickly become untenable as the size of the facilities grow and the number of devices connecting and utilizing the network increases.

BRIEF DESCRIPTION OF THE DRAWINGS

Various embodiments in accordance with the present disclosure will be described with reference to the drawings, in which.

DETAILED DESCRIPTION

Figure 1:
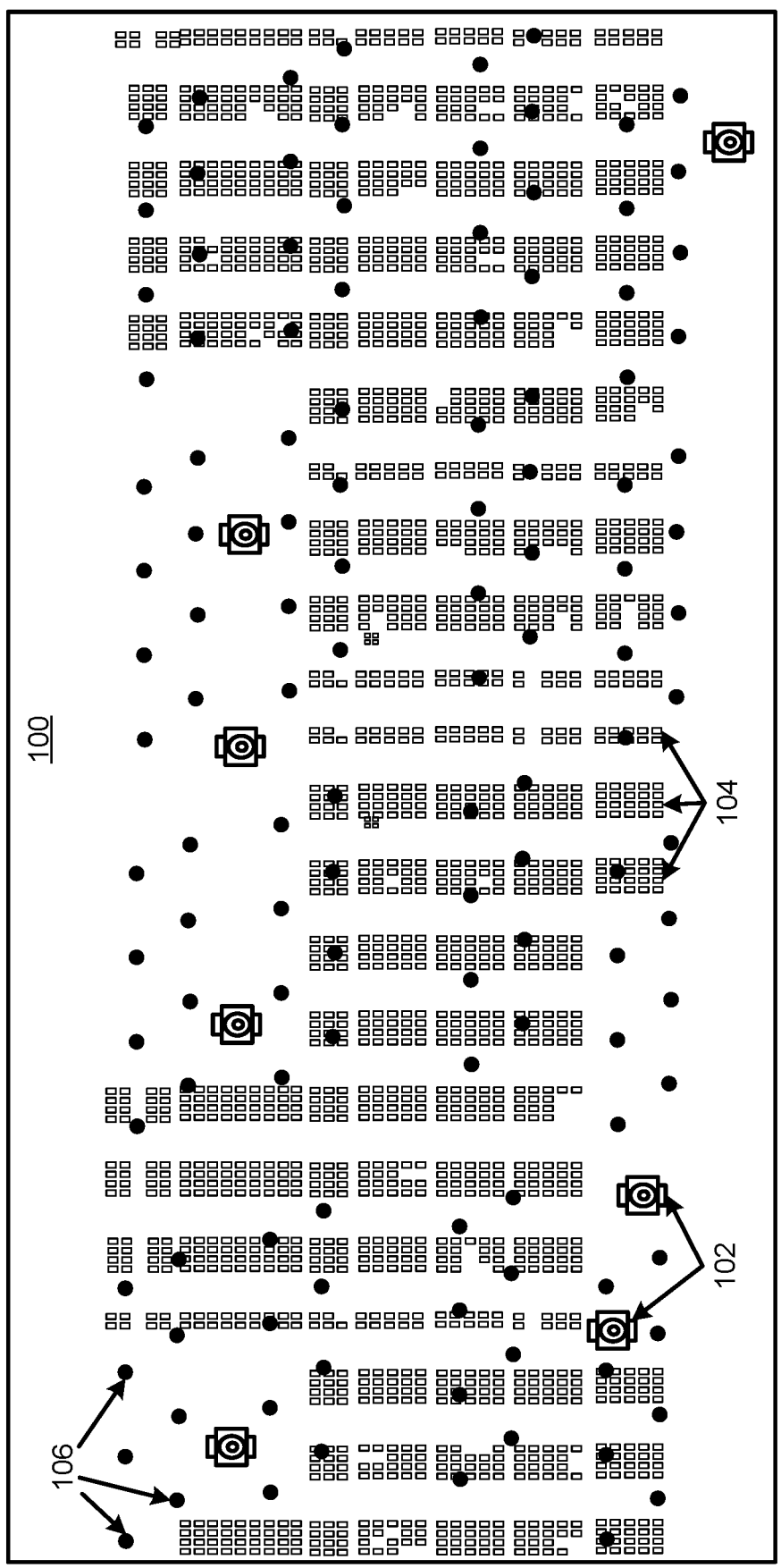
FIG. 1 illustrates components of a facility including wireless access points, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a scalable wireless network feature for instantiating, maintaining, and de-instantiating virtual partitions on a server computer that are associated with a wireless virtual local area network (VLAN). The scalable wireless network feature may be implemented in a network architecture for a facility where a plurality of wireless devices access, move, and otherwise interact with the facility and communicate via the wireless network of the facility. Wireless devices performing tasks in a facility may be required to move or roam throughout the facility as they perform tasks. In such cases, the wireless network must be configured to efficiently handle the network traffic to and from the wireless devices despite their physical location constantly being updated as they perform tasks. The components of the wireless network must be able to quickly and efficiently locate each wireless device as well as maintain mapping information which enables other devices or systems to communicate with each wireless device. Traditional network architectures may utilize a layer 3 Open Systems Interconnection Model (OSI) network protocol with a bridge to a layer 2 OSI network protocol in order to handle communications between the multiple wireless devices accessing a facility. However, this conventional network architecture has several flaws. For example, including the wireless devices on the same subnet in the layer 2 can result in some communications, such as broadcasts of frames, being provided to all nodes or devices in the wireless network. If the frame included malicious data it would quickly be communicated throughout the wireless network to all devices. Moreover, if looping occurs between some devices on the wireless network it can effectively crash the network which would result in some devices, such as autonomous mobile devices of the facility, from performing tasks. Other flaws include the vertical scaling solution to increased wireless devices accessing or requiring usage of the network architecture of a facility. A layer 3 OSI network protocol may be configured to add more routers to handle network traffic from the newly added wireless devices. However, the vertical scaling of adding new routers to the layer 3 OSI network protocol in the network architecture quickly becomes untenable as more wireless devices are added to the network.

Systems and methods described herein provide solutions to these and other problems with wireless network architectures implemented in facilities. In a non-limiting example, a facility may have multiple access points (wireless access points) situated throughout the facility. Examples of a facility include a warehouse, distribution center, fulfillment center, etc. A facility may also include a plurality of wireless devices, such as autonomous ground vehicles (autonomous mobile robots, mobile drive units), mobile devices, or other devices configured to communicate wirelessly. The wireless devices may be configured to receive and transmit data, such as mapping requests, location data, or data about the wireless connectivity between themselves and the multiple access points in the facility. The facility may include one or more components (e.g., network components) such as intermediate distribution frames, ingress and egress tunnel routers, layer 2 access switches, wireless access points, routers, and compute resources for implementing the network architecture of the scalable wireless network feature described herein. As wireless devices perform tasks within a facility they may be required to move throughout the facility and thereby create roaming events. Roaming events may refer to a process for a wireless device to successfully switch from one access point of the facility to another access point of the facility. To switch from one access point to another access point may require the wireless device to authenticate with the network via a proximate wireless access point and also requires components of the network to update mapping information for the wireless device to process subsequent communications to and from the wireless device. Improper network architecture implementations can result in long roam times which refer to a wireless device being unable to move and continue to perform a task as it has not properly moved from one access point to another access point. As used herein, the phrase "access points" includes devices that act as transmitters and receivers of local area wireless network signals (e.g., "Wi-Fi", Long Term Evolution (LTE), Bluetooth, WirelessHD and WiGig, and Z-Wave).

As used herein, the phrase "autonomous mobile robot" may include a unit that is capable of moving within a facility and may include any appropriate components for propelling itself and navigating to a particular destination within the facility. An autonomous mobile robot and a wireless device may also be capable of gathering and sending information about network connectivity to the wireless network of the facility to a computer such as server provider computers implementing the scalable wireless network feature described herein. In embodiments, the service provider computers may implement a virtual partition that is associated with a particular VLAN of a plurality of VLANs of a wireless network of a facility. The scalable wireless network feature described herein may be configured to transfer the vertical scalability of the layer 3 of the network architecture solution (e.g., adding more routers to the network) to a server computer that implements a virtualized layer 2 network. A server computer proximately located to the facility or within the facility may be configured to instantiate and maintain virtual partitions which are configured to handle the control plane aspects of the network traffic or communications from the wireless devices as they roam throughout the facility performing tasks. As more devices are added to the facility and associated wireless network, the server computer can instantiate new virtual partitions which may be associated with new VLANs thereby horizontally scaling the available resources to handle the increased amount of devices and traffic accessing the wireless network of the facility. The server computer may maintain one or more thresholds associated with roaming events per second from the wireless devices.

In accordance with at least one embodiment, the server computer may be configured to receive or otherwise obtain information that identifies the roaming per second events created by the wireless devices moving throughout the facility to perform tasks. The server computer implementing the scalable wireless network feature may be configured to compare the information about the roaming per second events to the threshold. In embodiments, if the roaming per second events exceed the threshold the server computer can instantiate a new virtual partition for handling the mapping requests and other control plane data requests from wireless devices that are associated with a corresponding VLAN. The server computer may also de-instantiate virtual partitions based on the information indicating that a particular virtual partition is underutilized or is at or below another threshold of roaming per second events. By utilizing an overlay of a virtualized layer 2 network with the associated layer 3 network, the wireless network architecture of a facility can efficiently handle scaling to meet the demands of adding new wireless devices to the network without increasing roam times or down times by the devices. Moreover, by implementing multiple VLANs communications of malicious data may be contained to a single VLAN while loops may only cause one VLAN to temporarily be inaccessible. Further, wireless devices do not have to continually authenticate with the network and therefore can continue to move throughout the facility connecting to various access points as needed to communicate information to other wireless devices to perform necessary tasks.

FIG. 1 illustrates components of a facility including wireless access points, in accordance with at least one embodiment. Facility 100 includes one or more mobile drive units 102, one or more inventory holders 104, and one or more access points (wireless access points) 106. The facility 100 may include a computer system such as a server computer, one or more inventory stations, and one or more network architecture components such as routers, intermediate distribution frames, and access switches (not pictured) which communicate via a wireless or wired network. Users or entities (not pictured) may access the facility 100 with associated mobile devices to perform tasks throughout the facility 100. Mobile drive units 102 transport inventory holders 104 between points within the facility 100 in response to commands communicated by a computer such as a server computer. Each inventory holder 104 stores one or more types of inventory items. As a result, the components of the facility 100 are capable of moving inventory items between locations within facility 100 to facilitate the entry, processing, and/or removal of inventory items from the facility and the completion of other tasks involving inventory items. Although the components of FIG. 1 and the facility 100 described herein refer to moving inventory embodiments disclosed herein are not limited to such use cases. The scalable wireless network feature described herein may be utilized to modify a network architecture for a facility that utilizes a number of wireless devices that access a wireless network and move throughout the facility.

A computer system assigns tasks to appropriate components of the facility 100 and coordinates operation of the various components in completing the tasks. These tasks may relate not only to the movement and processing of inventory items, but also to the management and maintenance of the components of facility 100. For example, the computer system may assign portions of the facility 100 as parking spaces for mobile drive units 102, the scheduled recharge or replacement of mobile drive unit batteries, the storage of empty inventory holders 104, or any other operations associated with the functionality supported by the facility 100 and its various components. The computer system may select components of the facility 100 to perform these tasks and communicate appropriate commands and/or data to the selected components to facilitate completion of these operations. Although the computer system described with reference to FIG. 1 is described as a single, discrete component, the computer system may represent multiple components, including network architecture components, and may represent or include portions of mobile drive units 102 or other elements of the facility 100. As a result, any or all of the interactions between a particular mobile drive unit 102, other wireless devices, and the computer system that are described below may, in particular embodiments, represent peer-to-peer communication between that mobile drive unit 102 and one or more other mobile drive units 102. The contents and operation of the network architecture and the components of the network architecture for the facility are described with more reference in FIGS. 3 and 4 below.

Mobile drive units 102 move inventory holders 104 between locations within the facility 100. Mobile drive units 102 may represent any devices or components appropriate for use in the facility 100 based on the characteristics and configuration of inventory holders 104 and/or other elements of facility 100. Mobile drive units 102 may represent independent, self-powered devices configured to freely move about the facility 100. In alternative embodiments, mobile drive units 102 represent elements of a tracked inventory management system configured to move inventory holder 104 along tracks, rails, cables, crane system, or other guidance or support elements traversing the facility 100. In such an embodiment, mobile drive units 102 may receive power and/or support through a connection to the guidance elements, such as a powered rail. Additionally, wireless devices including mobile drive units 102 may be configured to utilize alternative conveyance equipment to move within the facility 100 and/or between separate portions of the facility 100.

Additionally, mobile drive units 102 and other wireless devices accessing the facility 100 may be capable of communicating with each other and with a computer system/server computer to receive or transmit information. For example, the information for mobile drive units 102 may be for identifying selected inventory holders 104, transmit the locations of mobile drive units 102, or exchange any other suitable information to be used by the computer system or mobile drive units 102 during operation in the facility 100. Mobile drive units 102 as well as other wireless devices accessing and moving in facility 100 may communicate with each other (e.g., other wireless devices and mobile drive units 102) and a computer system wirelessly, using access points 106 located within or about the facility 100, and/or in any other appropriate manner. As one example, particular embodiments of mobile drive unit 102 may communicate with a computer system and/or with one another using 802.11, Bluetooth, or Infrared Data Association (IrDA) standards, or any other appropriate wireless communication protocol via the access points 106. As another example, in a tracked facility, tracks or other guidance elements upon which mobile drive units 102 move may be wired to facilitate communication between mobile drive units 102 and other components of the facility 100. Communication between a mobile drive unit 102 and another mobile drive unit 102, another wireless device, or a computer system of facility 100 may represent communication between network components of the facility 100 and an access point 106 transmitting information to and from the mobile drive unit 102, another wireless device, or a computer system of facility 100. In general, mobile drive units 102 may be powered, propelled, and controlled in any manner appropriate based on the configuration and characteristics of facility 100.

Inventory holders 104 store inventory items. In a particular embodiment, inventory holders 104 include multiple storage bins with each storage bin capable of holding one or more types of inventory items. Inventory holders 104 are capable of being carried, rolled, and/or otherwise moved by mobile drive units 102. In particular embodiments, inventory holder 104 may provide additional propulsion to supplement that provided by mobile drive unit 102 when moving inventory holder 104.

Additionally, each inventory holder 104 may include a plurality of faces, and each bin may be accessible through one or more faces of the inventory holder 104. For example, in a particular embodiment, inventory holder 104 includes four faces. In such an embodiment, bins located at a corner of two faces may be accessible through either of those two faces, while each of the other bins is accessible through an opening in one of the four faces. Mobile drive unit 102 may be configured to rotate inventory holder 104 at appropriate times to present a particular face and the bins associated with that face to a user, entity, or other components of the facility 100.

Inventory items represent any objects suitable for storage, retrieval, and/or processing in an automated facility 100. For the purposes of this description, "inventory items" may represent any one or more objects of a particular type that are stored in facility 100. Thus, a particular inventory holder 104 is currently "storing" a particular inventory item if the inventory holder 104 currently holds one or more units of that type. As one example, facility 100 may represent a mail order warehouse facility, and inventory items may represent merchandise stored in the warehouse facility. During operation, mobile drive units 102 may retrieve inventory holders 104 containing one or more inventory items requested in an order to be packed for delivery to a customer or inventory holders 104 carrying pallets containing aggregated collections of inventory items for shipment. Moreover, in particular embodiments of facility 100, boxes containing completed orders may themselves represent inventory items. As another example, facility 100 may represent a storage warehouse facility, and inventory items may represent vehicles that are stored, move within, and otherwise access the facility 100. During operation, wireless devices may move throughout the facility 100 and interact with the vehicles as well as access points 106 to receive and transmit information to components of the facility 100.

In operation, a computer system of facility 100 selects appropriate components to complete particular tasks and transmits task assignments to the selected components to trigger completion of the relevant tasks. Each task assignment defines one or more tasks to be completed by a particular component of facility 100. These tasks may relate to the retrieval, storage, replenishment, and counting of inventory items and/or the management of mobile drive units 102, inventory holders 104, and other components of the facility 100. Depending on the component and the task to be completed, a particular task assignment may identify locations, components, and/or actions associated with the corresponding task and/or any other appropriate information to be used by the relevant component in completing the assigned task.

In particular embodiments, a computer system of facility 100 generates task assignments based, in part, on inventory requests or information about wireless devices accessing the facility that the computer system receives from other components of facility 100 and/or from external components in communication with the computer system of facility 100. The inventory requests identify particular operations to be completed involving inventory items stored or to be stored within facility 100 and may represent communication of any suitable form. For example, in particular embodiments, an inventory request may represent a shipping order specifying particular inventory items that have been purchased by a customer and that are to be retrieved from facility 100 for shipment to the customer. The computer system of facility 100 may also generate task assignments independently of such inventory requests, as part of the overall management and maintenance of the facility 100 and the wireless network of facility 100. After generating one or more task assignments, a computer system of the facility 100 transmits the generated task assignments to appropriate components for completion of the corresponding task. The relevant components then execute their assigned tasks.

With respect to mobile drive units 102 specifically, a computer system of facility 100 may, in particular embodiments, communicate task assignments or updated network communications information to selected mobile drive units 102 that identify one or more destinations or instructions for the selected mobile drive units 102. A computer system of facility 100 may select a mobile drive unit 102 or wireless device accessing the facility to assign the relevant task based on the location or state of the selected mobile drive unit 102 or wireless device, an indication that the selected mobile drive unit 102 or wireless device has completed a previously-assigned task, a predetermined schedule, and/or any other suitable consideration. These destinations may be associated with an inventory request a computer system of the facility 100 is executing or a management objective a computer system of the facility 100 is attempting to fulfill. For example, the task assignment may define the location of an inventory holder 104 to be retrieved, a storage location where the mobile drive unit 102 should park until receiving another task, or a location associated with any other task appropriate based on the configuration, characteristics, and/or state of facility 100, as a whole, or individual components of facility 100.

While the appropriate components of facility 100 complete assigned tasks, a computer system of facility 100 may interact with the relevant components, such as network components, to ensure the efficient use of space, equipment, manpower, wireless networks, and other resources available to facility 100. As one specific example of such interaction, a computer system of facility 100 is responsible, in particular embodiments, for generating new VLANs, instructing instantiation of a new virtual partition to associate with the VLAN, and assigning new wireless devices accessing the facility to the new VLAN and new virtual partition. The computer system of facility 100 may be configured to authenticate new wireless devices accessing the facility 100. The computer system of the facility 100 may be responsible, in particular embodiments, for planning the paths mobile drive units 102 take when moving within facility 100 and for allocating use of a particular portion of facility 100 to a particular mobile drive unit 102 for purposes of completing an assigned task. In such embodiments, mobile drive units 102 may, in response to being assigned a task, request a path to a particular destination associated with the task.

Components of facility 100 such as network components of a wireless network maintained for the facility 100 may provide information to an associated computer system regarding their current state, other components of facility 100 with which they are interacting, and/or other conditions relevant to the operation of facility 100. This may allow a computer system of facility 100 to utilize feedback from the relevant components to update algorithm parameters, adjust policies, or otherwise modify its decision-making to respond to changes in operating conditions or the occurrence of particular events, such as instantiating new virtual partitions based on information that indicates that roaming per second events by wireless devices, such as mobile drive units 102, exceed a maintained threshold. For example, mobile drive unit 102 may provide network traffic information associated with the access points 106 to a computer system of the facility 100 for use in embodiments described herein.

Figure 2:
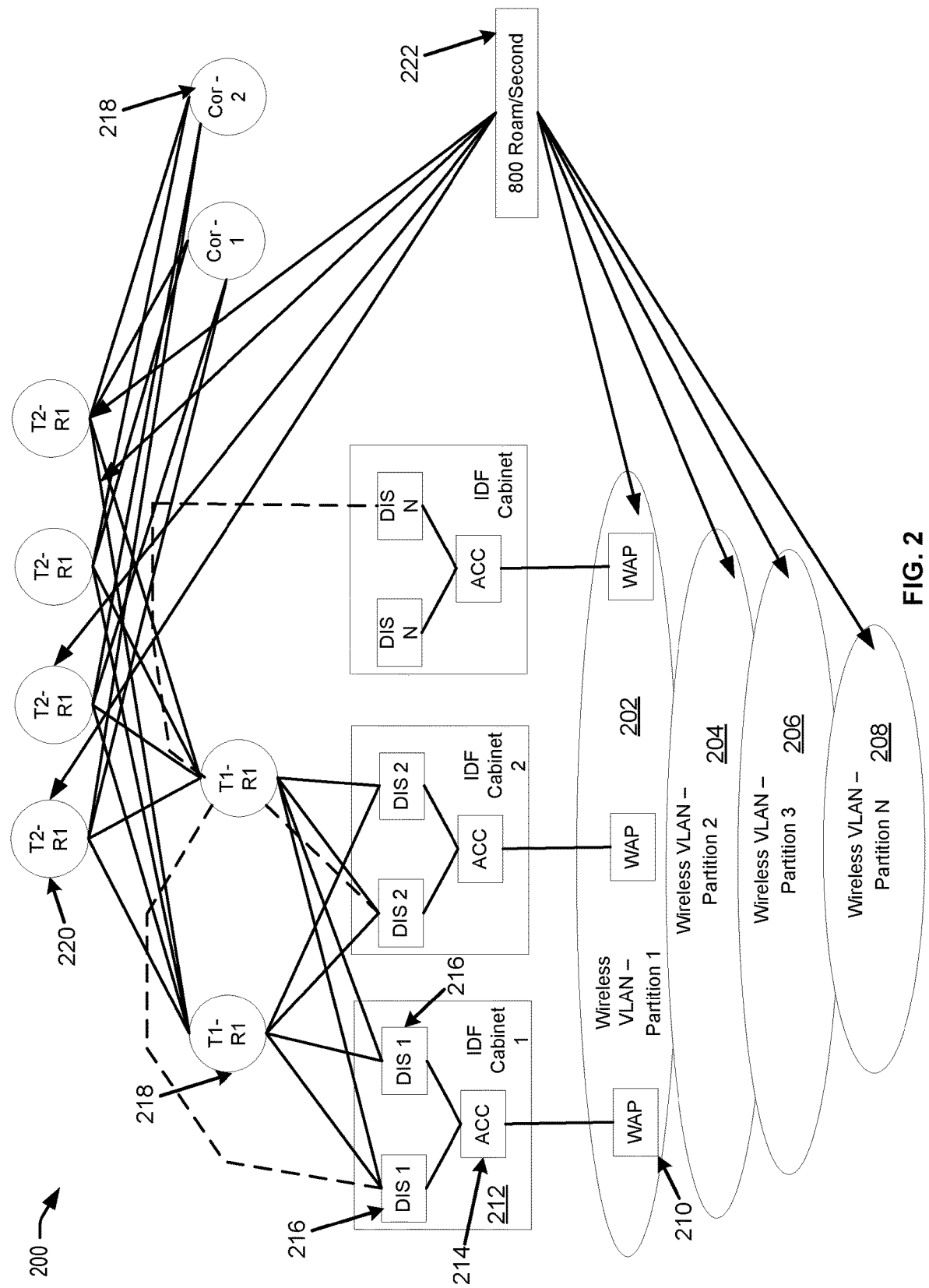
FIG. 2 illustrates a conventional network architecture for a facility.

FIG. 2 illustrates a conventional network architecture 200 for a facility. The conventional network architecture 200 for a facility includes several wireless components or components of a wireless network for a facility. The components depicted in FIG. 2 include several wireless virtual local area networks (VLANs) 202-208, maintained and/or in communication with one or more wireless access points (WAP) 210, one or more intermediate distribution frame (IDF) cabinets 212, an access layer 2 switch) 214, one or more ingress and egress tunnel routers (DIS 1, DIS 2, etc.,) 216, one or more routers (T1-R1, Cor-1, etc.,) 218, and one or more routers running the LISP mapping protocol (T2-R1) 220. The conventional network architecture 200 depicted in FIG. 2 depicts communications between components of the architecture including data plane communications and control plane communications between wireless devices (not pictured) and other wireless devices accessing a wireless network corresponding to the conventional network architecture 200.

For example, wireless devices associated with wireless VLAN partition 1 202 may transmit information or data that is to be communicated to a wireless device of VLAN partition 2 204. The information or data from one wireless device to another of different wireless VLAN partitions (202 and 204) are communicated via IDF cabinets (e.g., 212) to various routers (e.g., 218, 220). Additionally, mapping requests which may be part of the data transmission or a separate communication, are resolved by the same components (e.g., 212, 218, and 220). As newer wireless devices access the wireless network supported by the components of the conventional network architecture 200, the amount of control plane requests or mapping functions performed by the T2-R1 routers (e.g., 220) increases to the point of causing failures in equipment to handle such requests. As described herein, as wireless devices access and move throughout a facility, control plane communication such as mapping requests from each wireless device as they connect to different wireless access points 210 situated throughout a facility, may be transmitted to components of the wireless network such as T2-R1 routers (e.g., 220).

Conventional network architecture 200 via the components illustrated in FIG. 2 may only be capable of handling 800 roaming per second events 222. However, as new wireless VLANs are added to the wireless network for a facility the amount of mapping requests or roaming per second events will increase such that wireless devices may be left without instructions or awaiting instructions from the wireless network and conventional network architecture 200. As an example, a mobile robot accessing a wireless network associated with conventional network architecture 200 may move throughout a facility and as such be required to access multiple wireless access points 210 situated throughout the facility. As other components, such as other mobile robots, move throughout the facility or other components of the facility need to communicate with the mobile robot as it moves throughout the facility, data transmissions including mapping requests may need to be performed by the mobile robot. However, if the network architecture has reached its limit of 800 roaming per second events (e.g., no longer able to process subsequent mapping requests), the mobile robot may stop moving and stop performing an assigned task as it awaits for a mapping request or other data transmission request to process. Conventional architectures for facilities that are similar to conventional network architecture 200 may attempt to resolve such bottlenecks or network congestion by utilizing vertical scaling—such as by adding more T2-R1 routers (e.g., 220).

However, as more and more wireless devices access the wireless network for a facility this quickly becomes untenable. Entities responsible for the wireless network would be required to monitor the data transmissions or network congestions, locate an appropriate position with the facility for installation, install the router, authenticate the new router and other devices connecting to the router as well as update the other components of the network, etc. This process would need to be performed each time the network traffic reached peak limitations. Moreover, this can result in under-utilized resources for time periods where network traffic or congestion is low for a wireless network of a facility.

Figure 3:
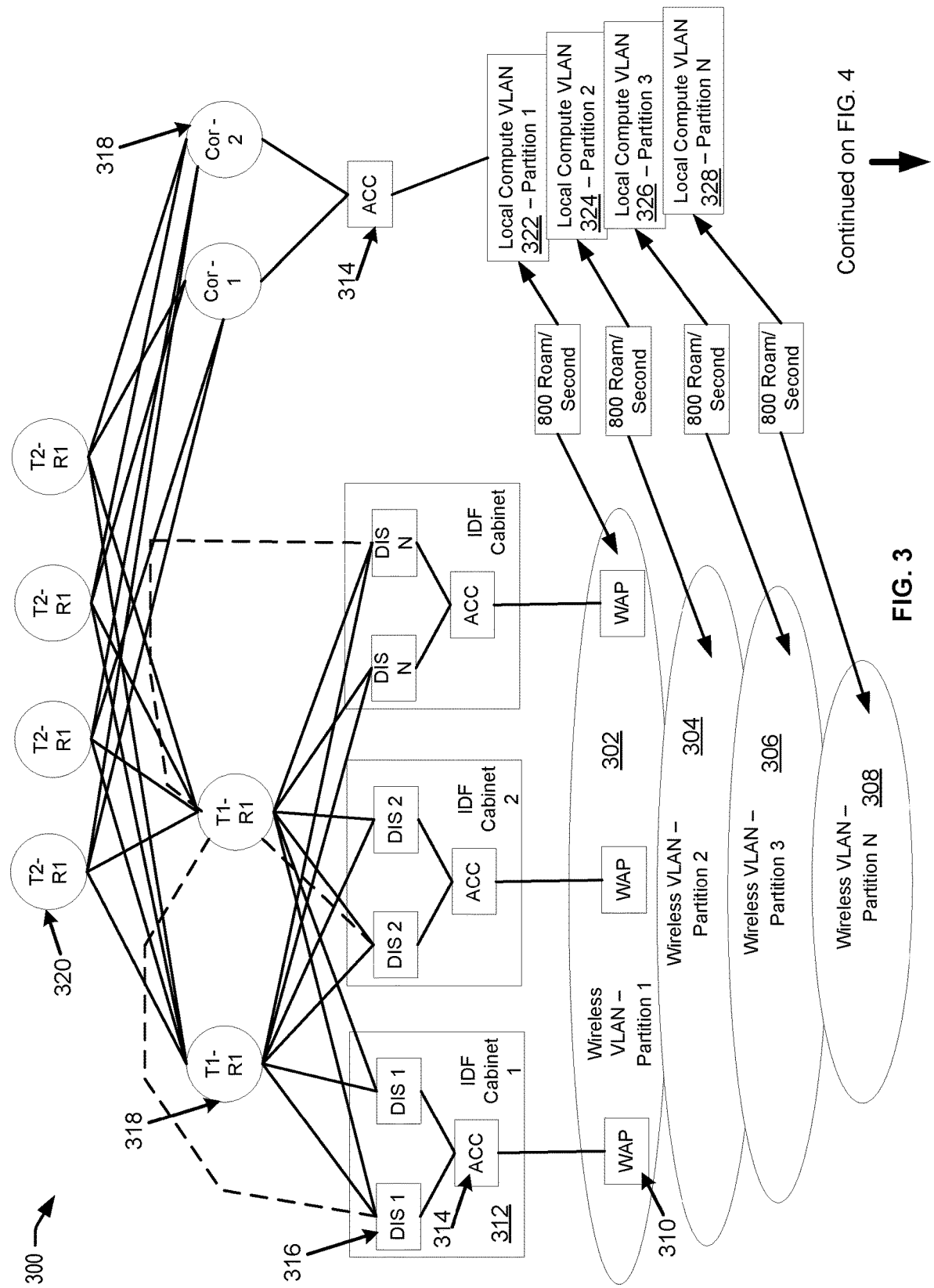
FIG. 3 illustrates an example network architecture for a facility that corresponds to a scalable network feature, in accordance with at least one embodiment.
Figure 4:
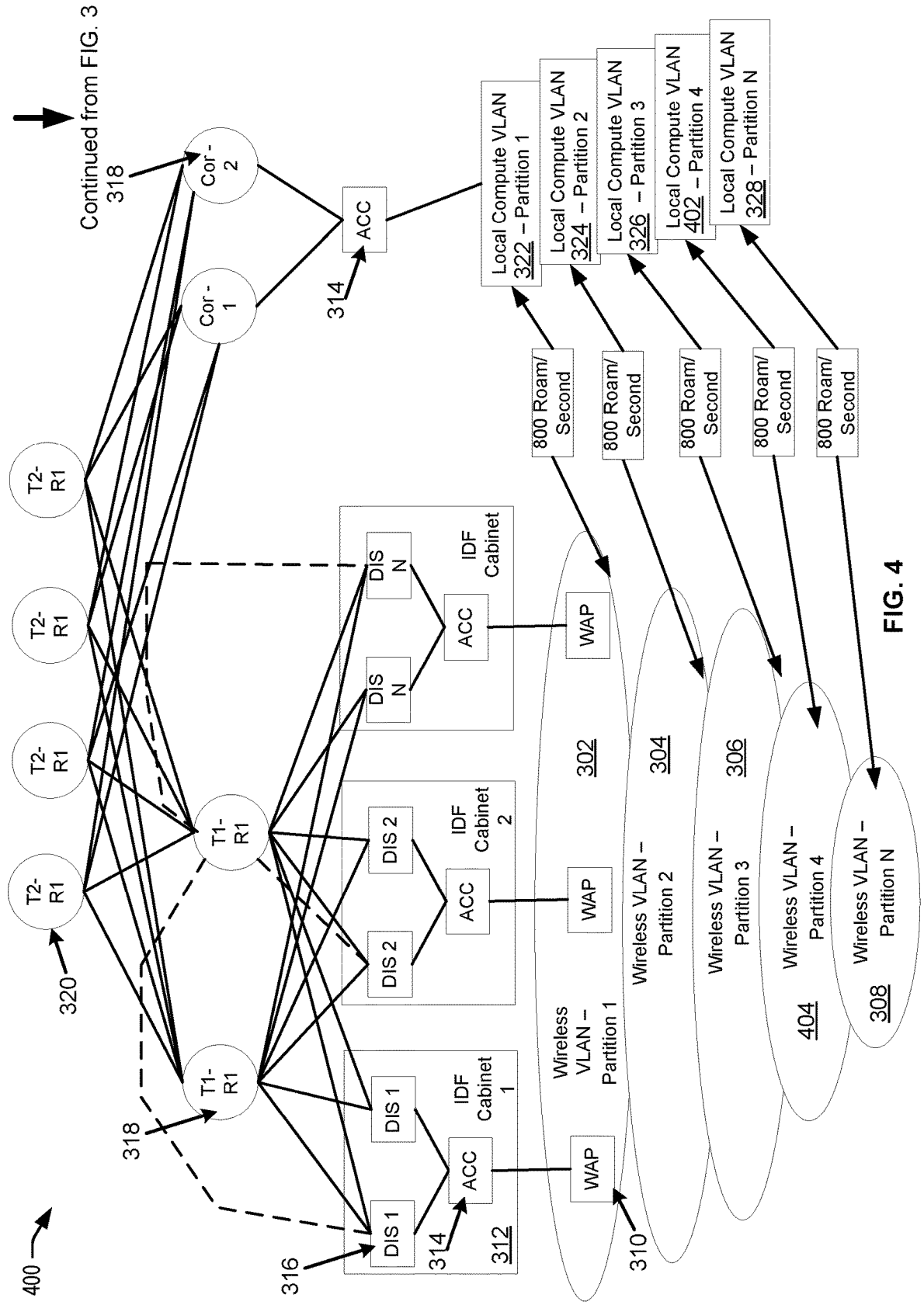
FIG. 4 illustrates an example network architecture for a facility that corresponds to a scalable network feature, in accordance with at least one embodiment.

FIG. 3 illustrates an example network architecture 300 for a facility that corresponds to a scalable network feature, in accordance with at least one embodiment. The example network architecture 300 for a facility includes several wireless components or components of a wireless network for a facility. Although FIGS. 3 and 4 depict several components of a wireless network embodiments of the current disclosure may utilize more or less components. The components depicted in FIG. 3 include several wireless virtual local area networks (VLANs) 302-308, maintained and/or in communication with one or more wireless access points (WAP) 310, one or more intermediate distribution frame (IDF) cabinets 312, an access layer 2 switch (ACC) 314, one or more ingress and egress tunnel routers (DIS 1, DIS 2, etc.,) 316, one or more routers (T1-R1, Cor-1, etc.,) 318, one or more routers running the LISP mapping protocol (T2-R1) 320, and a server computer proximately located to the facility referred to as a "local compute system" that is configured to instantiate, maintain, and de-instantiate a number of virtual partitions 322-328, each mapping to a unique VLAN (e.g., 302-308). In accordance with at least one embodiment, the functionality of processing or performing the computational processes for resolving a mapping requests to and from wireless devices of wireless VLANs (e.g., 302-308) are transferred from the (T2-R1) 320 to the virtual partitions 322-328. This results in each wireless VLAN partition (e.g., 302-308) being associated and in communication with a separate virtual partition (e.g., 322-328) for handling and processing the mapping requests of wireless devices accessing the wireless network of the facility. In embodiments, the Cor-1 routers 318 and ACC 314 of FIGS. 3 and 4 provide network connectivity to the one or more wireless devices of wireless VLANs (e.g., 302-308).

In accordance with at least one embodiment, the server computer implementing the virtual partitions 322-328 may be configured to receive information from the wireless network components, such as from the wireless devices themselves or from components 302-320, which indicates that roaming per second events being conducted by wireless devices of a particular wireless VLAN (e.g., 302, 304, 306, or 308). In embodiments, the server computer may be configured to maintain one or more thresholds of roaming per second events. The server computer may be configured to instantiate a new virtual partition in response to the information indicating that the roaming per second events by wireless devices accessing a facility exceed the threshold. For example, in example network architecture 300, each virtual partition (322-328) and corresponding wireless VLAN partition (302-308) may be configured to process up to 800 roaming per second events. In such cases, the server computer may maintain a threshold of 400 roaming per second events. In response to the information indicating that the roaming per second events are exceeding the threshold, the server computer may automatically instantiate a new virtual partition to associate with a new wireless VLAN. In example network architecture 300 the mapping requests or control plane data requests can be received and processed by the server computer and instantiated virtual partitions instead of other conventional component such as the T2-R1 routers 320.

By implementing such a scalable wireless network feature in a wireless network architecture for a facility horizontal scaling may be utilized. For example, the server computer can instantiate a number of virtual partitions, each one associated with a new wireless VLAN, to handle the increased network traffic or congestion from an increased amount of wireless devices accessing the wireless network of the facility. The server computer can also optimize utilization of resources by de-instantiating virtual partitions in response to information indicating a reduction in network traffic, congestion, or mapping requests. Therefore, virtual partitions may only be maintained that are required based on the network load placed on the wireless network of a facility. The server computer may communicate with the components of the example network architecture 300, such as with IDF cabinet 312, ACC 314, DIS 1 316, routers 318 and 320, and one or more wireless devices accessing the facility via wireless access points or via the maintained wireless network. Updates to the virtual partitions 322-328 can be transmitted to the IDF cabinets 312 via configuration files to associate new wireless VLANs with a particular virtual partition. By utilizing the architecture depicted in FIG. 3, mapping requests from a wireless device associated with a particular wireless VLAN (302) to another wireless device associated with a different particular wireless VLAN (304) may be received and processed by the appropriate virtual partition (e.g., 322 and 324) instead of the conventionally utilized T2-R1 routers 320. Moreover, the wireless devices accessing the wireless network utilizing the example network architecture 300 can move throughout the facility and continue to transmit and receive data through a virtualized layer 2 subnet with a layer 3 overlay. This reduces re-authentications required as the wireless device disconnects or ceases transmitting via one wireless access point 310 and begins communicating with another wireless access point 310 that may be associated with different network components such as a different IDF cabinet 312.

FIG. 4 illustrates an updated state of an example network architecture for a facility that corresponds to a scalable network feature, in accordance with at least one embodiment. FIG. 4 depicts an updated state 400 of the example network architecture 300 in response to instantiating a new virtual partition 402 and corresponding wireless VLAN 404. As described herein, a server computer of the example network architecture 300 for a facility may be configured to receive information that identifies a number of roaming per second events by wireless devices accessing the wireless network of the facility. The server computer may receive or otherwise obtain the roaming per second events by the wireless devices in aggregate (e.g., from all wireless devices accessing the wireless network) or from the wireless devices associated with each wireless VLAN (e.g., the wireless devices associated with each particular wireless VLAN (302-308 and 404) by querying each partition (322, 324, 326, etc.) for utilization information.

The server computer may compare the roaming per second events conducted by the wireless devices to one or more thresholds and determine, automatically, to instantiate a new virtual partition (e.g., 402) to relieve the stress or potential network congestion to the other virtual partitions (322-328) and corresponding wireless VLANs (302-308). The updated state 400 of the example network architecture 300 depicts the horizontal scaling of the network to accommodate increased network traffic due to an increasing number of wireless devices accessing the wireless network of a facility. A server computer may be configured to instantiate a number of virtual partitions thereby ensuring that network resources are always available to handle the network traffic of components accessing the facility or utilizing the wireless network of the facility. The server computer implementing the virtual partitions may be configured to handle the computational processing of the mapping requests transmitted by the wireless devices of each wireless VLAN (302-308 and 404) while maintaining the virtualized subnets of each corresponding wireless VLAN. This can provide protections as communications that may be malicious can still be contained to each VLAN instead of broadcasting to every wireless device connecting to the wireless network of a facility.

Figure 5:
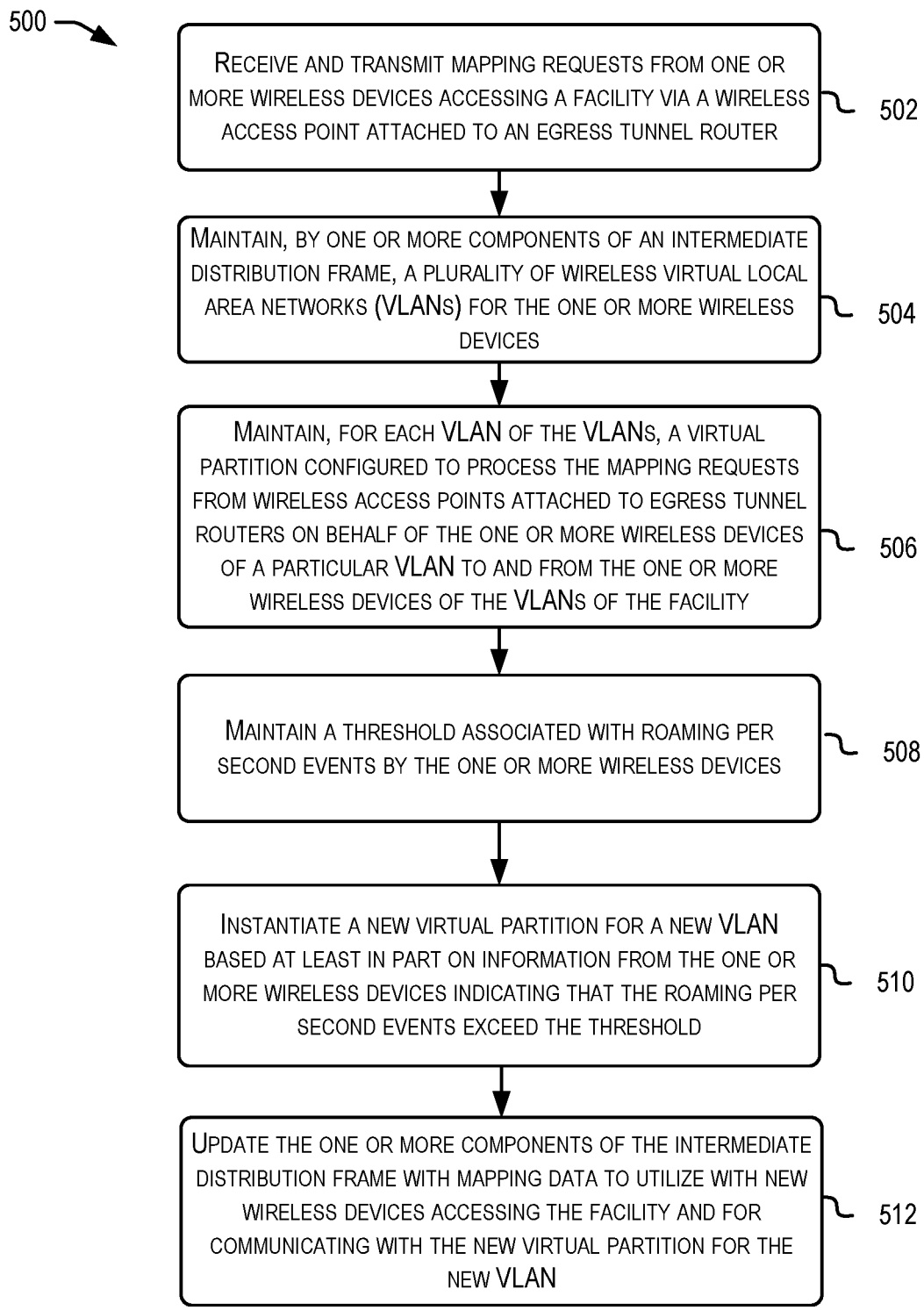
FIG. 5 illustrates an example flow diagram for a scalable network feature, in accordance with at least one embodiment.
Figure 6:
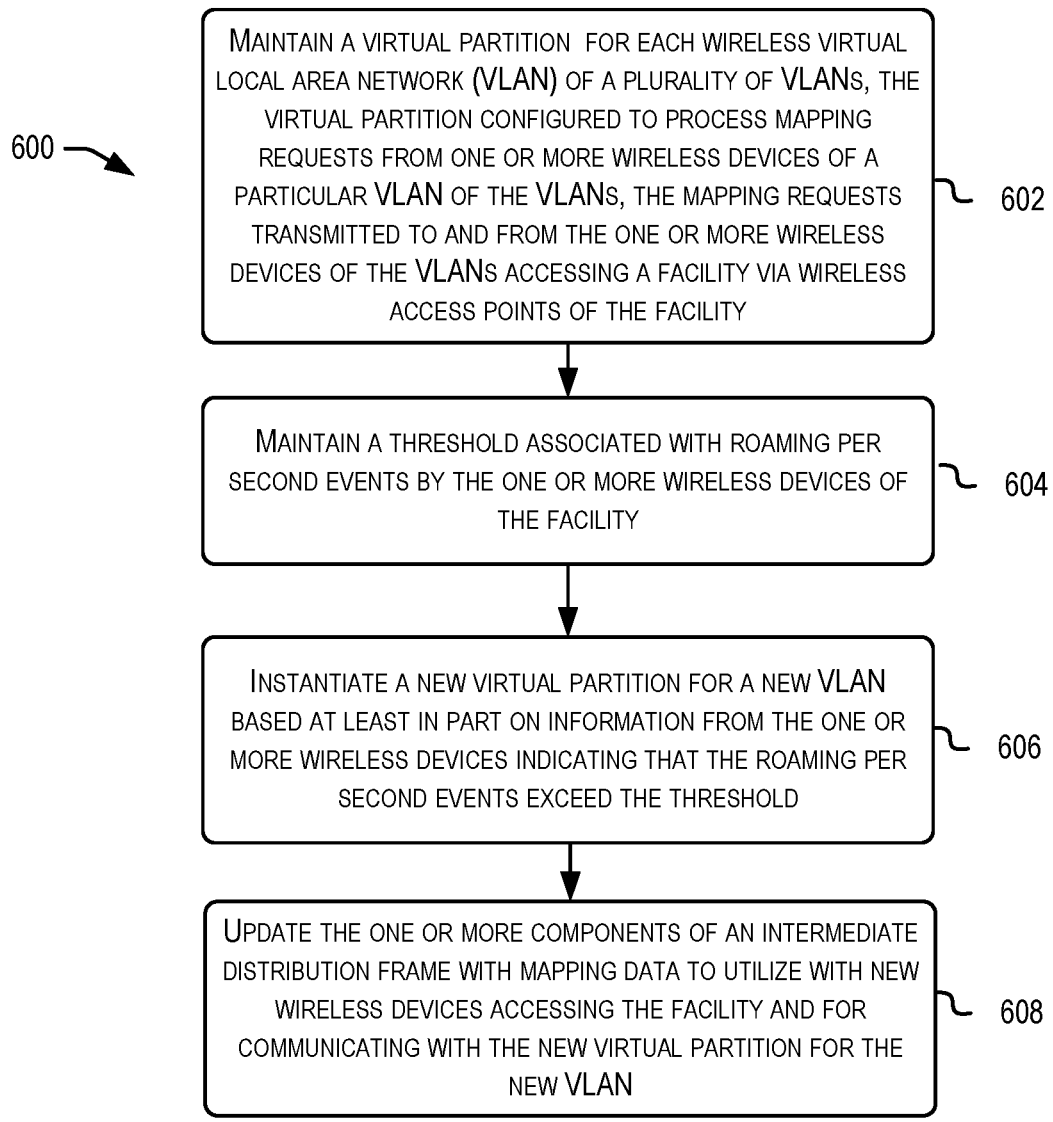
FIG. 6 illustrates an example flow diagram for a scalable network feature, in accordance with at least one embodiment.

FIGS. 5 and 6 illustrate example flow charts for scalable wireless network features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the descried operations can be combined in any order and/or in parallel to implement the process.

Additionally, some, any, or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 7:
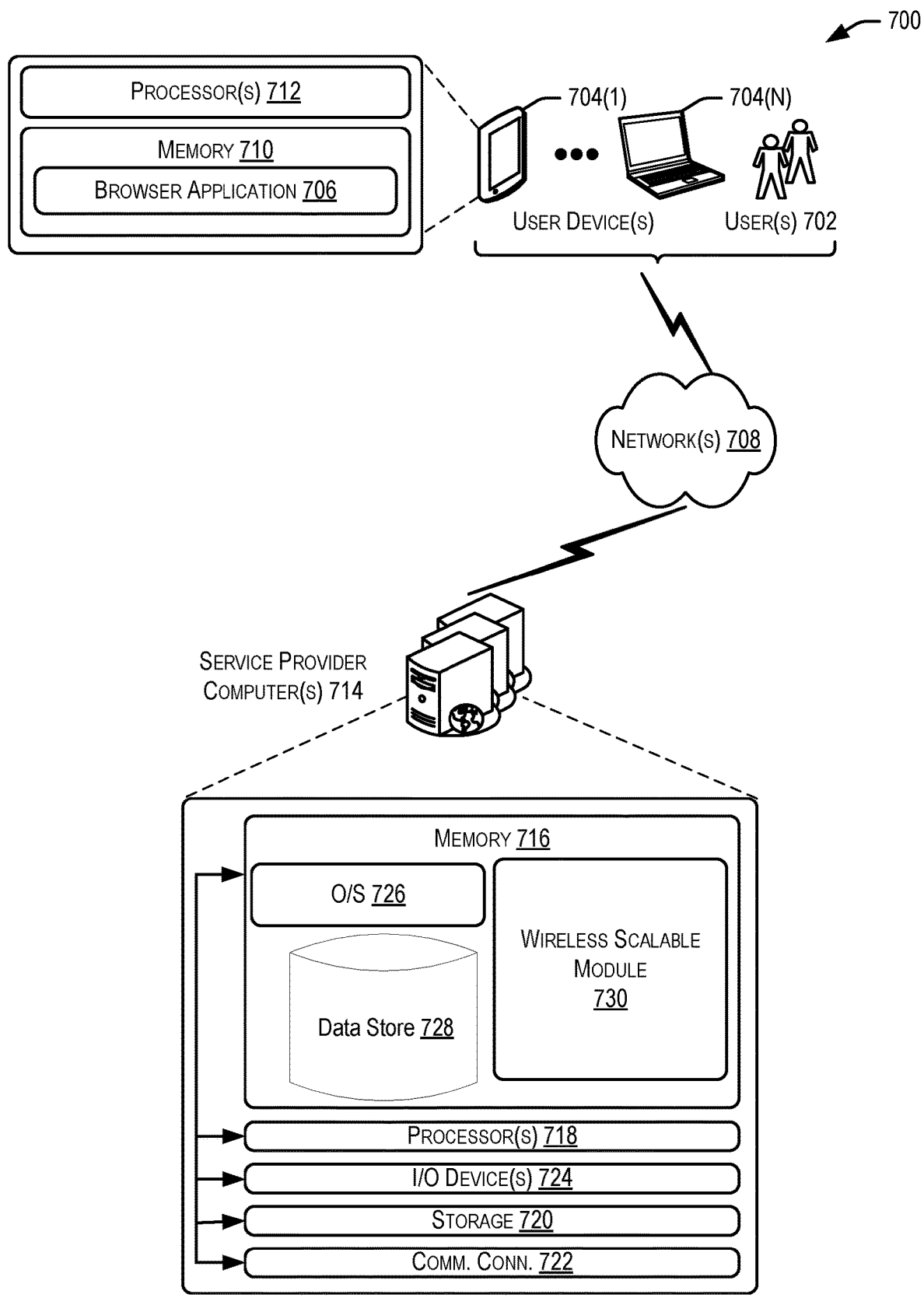
FIG. 7 illustrates an example architecture for implementing a scalable network feature, in accordance with at least one embodiment.

In some examples, the service provider computers (service provider computers 714) utilizing at least the wireless scalable module 730 depicted in FIG. 7 may perform the processes 500 and 600 of FIGS. 5 and 6. In FIG. 5, the process 500 may include receiving and transmitting mapping requests from one or more wireless devices accessing a facility via a wireless access point attached to an egress tunnel router at 502. The process 500 may include maintaining, by one or more components of an intermediate distribution frame, a plurality of wireless virtual local area networks (VLANs) for the one or more wireless devices at 504. In accordance with at least one embodiment, a VLAN of the VLANs is associated with a device type of one or more device types associated with the one or more wireless devices. For example, a particular VLAN may be associated with autonomous mobile robots that are accessing, moving, and performing tasks within a facility, while a different VLAN may be associated with mobile devices of users or entities accessing and moving within the facility.

The process 500 may include maintaining, for each VLAN of the VLANs, a virtual partition configured to process the mapping requests from wireless access points attached to egress tunnel routers on behalf of the one or more wireless devices of a particular VLAN to and from the one or more wireless devices of the VLANs of the facility at 506. In embodiments, each virtual partition is associated with a VLAN in a one-to-one relationship such that the mapping requests to and from the wireless devices of said VLAN are processed by the virtual partition. Each virtual partition and VLAN may include or be associated with a unique internet protocol (IP) subnet. As described herein, a virtual partition may refer to a virtual machine instance. A server computer may instantiate, maintain, and de-instantiate the virtual partitions as needed based on the roaming per second events exceeding a threshold as described herein. The process 500 may include maintaining a threshold associated with roaming per second events by the one or more wireless devices at 508.

In accordance with at least one embodiment, the threshold may be specified by an entity associated with the facility such as a network architecture engineer or a user associated with the facility. In embodiments, the threshold may be updated by the server computer based on historic roaming per second event information from the one or more wireless devices. The historic roaming per second event information may be obtained for a certain time period, e.g., the past hour, day, week, or month(s). The process 500 may include instantiating a new virtual partition for a new VLAN based at least in part on information from the one or more wireless devices indicating that the roaming per second events exceed the threshold at 510. The process 500 may include updating the one or more components of the intermediate distribution frame with mapping data to utilize with new wireless devices accessing the facility and for communicating with the new virtual partition for the new VLAN at 512. In embodiments, updating the intermediate distribution frame includes the server computer providing a configuration file to the intermediate distribution frame when a new virtual partition and new VLAN are generated.

The process 600 of FIG. 6 may include maintaining a virtual partition for each wireless virtual local area network (VLAN) of a plurality of VLANs at 602. The virtual partition may be configured to process mapping request from one or more wireless devices of a particular VLAN of the VLANs. The mapping requests may be transmitted to and from the one or more wireless devices of the VLANs accessing a facility via wireless access points of the facility. In embodiments, the wireless access point may be attached to an egress tunnel router. In accordance with at least one embodiment, the one or more wireless devices may be configured to transmit location pings while moving throughout the facility. The process 600 may include maintaining a threshold associated with roaming per second events by the one or more wireless devices of the facility at 604. In accordance with at least one embodiment, the server computers (service provider computers) may maintain a plurality of thresholds, where an individual threshold of the plurality of thresholds is associated with a specific device type of one or more device types associated with the one or more wireless devices. For example, the server computers may maintain one threshold of roaming per second events for autonomous mobile robots and maintain and utilize a different threshold of roaming per second events for mobile devices of entities accessing and moving within the facility.

The process 600 may include instantiating a new virtual partition for a new VLAN based at least in part on information from the one or more wireless devices indicating that the roaming per second events exceed the threshold at 606. The process 600 may include updating the one or more components of an intermediate distribution frame with mapping data to utilize with new wireless devices accessing the facility and for communicating with the new virtual partition for the new VLAN at 608. In accordance with at least one embodiment, the VLANs and new VLAN are maintained by one or more components of the intermediate distribution frame. The one or more components of the intermediate distribution frame may include a layer two access switch, an ingress tunnel router, and an egress tunnel router as well as other suitable components for maintaining a layer two Open Systems Interconnection Model (OSI) network protocol. In accordance with at least one embodiment, new wireless devices accessing the facility may authenticate with the intermediate distribution frame, and once authenticated, may be assigned to the new virtual partition and associated new VLAN.

FIG. 7 illustrates an example architecture for implementing a scalable network feature as described herein that includes one or more service provider computer(s) and/or a user device connected via one or more networks, in accordance with at least one embodiment. In architecture 700, one or more users 702 (i.e., scalable network feature users, network architects, entities associated with a facility) may utilize user computing devices 704(1)-(N) (collectively, user computing devices 704) to access a browser application 706 configured to provide information about the scalable network feature (e.g., a web browser), via one or more networks 708. In some aspects, the browser application 706 may be hosted, managed, and/or provided by a computing resources service or service provider, such as by utilizing one or more service provider computer(s) 714 associated with the system. The one or more service provider computer(s) 714 may provide a native application which is configured to run on the user devices 704 which the user 702 may interact with to be presented with information about the scalable network feature for a facility as described herein. The one or more service provider computer(s) 714 may, in some examples, provide computing resources such as, but not limited to, client entities, low latency data storage, durable data storage, data access, management, virtualization, cloud-based software solutions, electronic content performance management, etc. The one or more service provider computer(s) 714 may also be operable to provide web hosting, computer application development, and/or implementation platforms, combinations of the foregoing, or the like to the one or more users 702. The one or more service provider computer(s) 714, in some examples, may obtain network traffic information for a facility, maintain a threshold associated with the network traffic of the facility, maintain virtual partitions or instances that are associated with a wireless virtual local area network, and instantiate a new virtual partition based on the network traffic and a maintained threshold.

In some examples, the networks 708 may include any one or a combination of many different types of networks, such as cable networks, the Internet, wireless networks, cellular networks and other private and/or public networks. While the illustrated example represents the users 702 accessing the browser application 706 over the networks 708, the described techniques may equally apply in instances where the users 702 interact with the one or more service provider computer(s) 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 706 may allow the users 702 to interact with the service provider computer(s) 714 by providing input into the browser application 706. The browser application 706 may provide users with options to specify thresholds for certain virtual local area networks of a facility, specify thresholds for certain types of devices accessing or interacting with a facility, or view network traffic, thresholds, and virtual partitions already instantiated for a facilities wireless network architecture.

The user devices 704 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 704 may be in communication with the one or more service provider computer(s) 714 via the networks 708, or via other network connections. Additionally, the user devices 704 may be part of the distributed system managed by, controlled by, or otherwise part of the one or more service provider computer(s) 714 (e.g., a console device integrated with the one or more service provider computer(s) 714).

In accordance with at least one embodiment, the user devices 704 may include at least one memory 710 and one or more processing units (or processor(s)) 712. The processor(s) 712 may be implemented as appropriate in hardware, computer-executable instructions, firmware, or combinations thereof. Computer-executable instruction or firmware implementations of the processor(s) 712 may include computer-executable or machine-executable instructions written in any suitable programming language to perform the various functions described. The user devices 704 may also include geo-location devices (e.g., a global positioning system (GPS) device or the like) for providing and/or recording geographic location information associated with the user devices 704.

The memory 710 may store program instructions that are loadable and executable on the processor(s) 712, as well as data generated during the execution of these programs. Depending on the configuration and type of user device 704, the memory 710 may be volatile (such as random access memory (RAM)) and/or non-volatile (such as read-only memory (ROM), flash memory, etc.). The user device 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein including at least a user provided input element or electronic service web page, such as via the browser application 706 or dedicated applications (e.g., smart phone applications, tablet applications, etc.). The browser application 706 may be configured to receive, store, and/or display a website or other interface for interacting with the one or more service provider computer(s) 714. Additionally, the memory 710 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 702 provided response to a security question or a geographic location obtained by the user device 704.

In some aspects, the one or more service provider computer(s) 714 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computer(s) 714 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the one or more service provider computer(s) 714 may be in communication with the user devices 704 and/or other service providers via the networks 708, or via other network connections. The one or more service provider computer(s) 714 may include one or more servers, perhaps arranged in a cluster, as a server farm, or as individual servers not associated with one another. These servers may be configured to implement the inventory management system network traffic services described herein as part of an integrated, distributed computing environment.

In one illustrative configuration, the one or more service provider computer(s) 714 may include at least one memory 716 and one or more processing units (or processor(s)) 718. The processor(s) 718 may be implemented as appropriate in hardware, computer-executable instructions, firmware, or combinations thereof. Computer-executable instruction or firmware implementations of the processor(s) 718 may include computer-executable or machine-executable instructions written in any suitable programming language to perform the various functions described.

The memory 716 may store program instructions that are loadable and executable on the processor(s) 718, as well as data generated during the execution of these programs. Depending on the configuration and type of the one or more service provider computer(s) 714, the memory 716 may be volatile (such as RAM) and/or non-volatile (such as ROM, flash memory, etc.). The one or more service provider computer(s) 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 716 may include multiple different types of memory, such as SRAM, DRAM, or ROM.

The memory 716, the additional storage 720, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. Additional types of computer storage media that may be present in the one or more service provider computer(s) 714 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computer(s) 714. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computer(s) 714 may also contain communications connection(s) 722 that allow the one or more service provider computer(s) 714 to communicate with a stored database, another computing device or server, user terminals and/or other devices on the networks 708. The one or more service provider computer(s) 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including a wireless scaling module 730. In accordance with at least one embodiment, the wireless scaling module 730 may be configured to instantiate, de-instantiate, and maintain one or more virtual partitions for processing mapping requests from one or more wireless devices associated with a wireless virtual local area network of a facility. In embodiments, the wireless scaling module 730 may be configured to maintain and update one or more thresholds associated with roaming per second events by the wireless devices accessing an associated facility. The wireless scaling module 730 may be configured to receive information indicating the roaming per second events occurring in a facility by the wireless devices of the wireless virtual local area networks of the facility. In embodiments, the wireless scaling module 730 can receive and transmit mapping requests from wireless devices of a facility to the instantiated partitions for processing. Responses to the wireless devices or components of the network architecture of the facility may be transmitted by the wireless scalable module 730 via networks 708.

Figure 8:
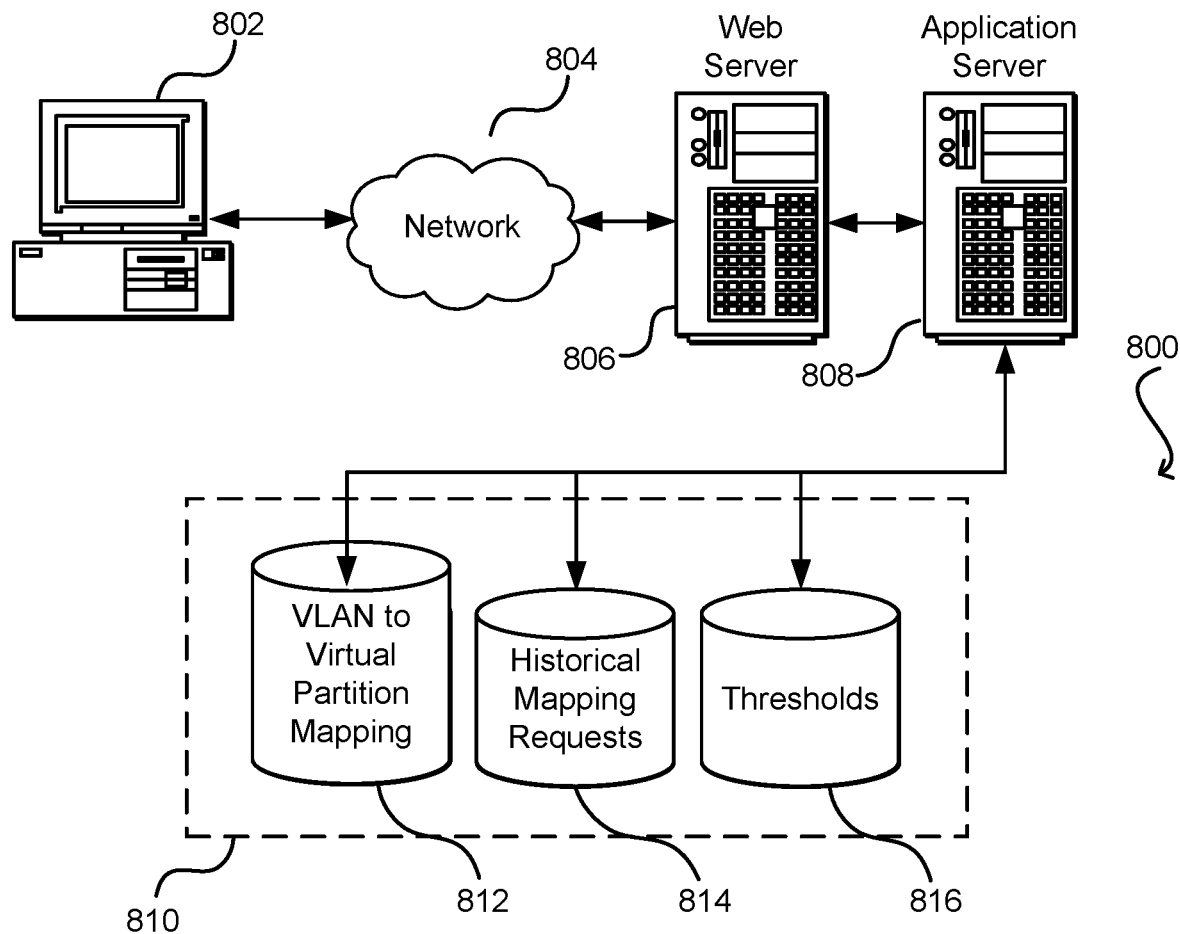
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing VLAN to virtual partition mapping data 812 and thresholds 816, which can be used to compare roaming per second events from wireless devices of a facility to a threshold. For example, if the roaming per second events for a wireless virtual local area network exceed the threshold, instructions may be invoked which instantiate a new partition and an associated new wireless virtual local area network. The data store also is shown to include a mechanism for storing historical mapping requests 814, which can be used for reporting, analysis, or other such purposes such as updating thresholds or associating certain device types with certain wireless virtual local area networks of a facility. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser. In another example, a user might submit a query regarding certain thresholds for a particular partition and associated wireless virtual local area network. The information then can be returned to the user which the user is able to view via a browser on the user device 802.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A network architecture of a facility, comprising:
a wireless access point attached to an egress tunnel router configured to receive and transmit mapping requests from one or more wireless devices accessing the facility;
a plurality of wireless virtual local area networks (VLANs) for the one or more wireless devices, the VLANs maintained by one or more components of an intermediate distribution frame, a VLAN of the VLANs associated with a device type of one or more device types associated with the one or more wireless devices; and
a server computer configured to:
maintain, for each VLAN of the VLANs, a virtual partition configured to process the mapping requests from wireless access points attached to egress tunnel routers on behalf of the one or more wireless devices of a particular VLAN to and from the one or more wireless devices of the VLANs of the facility;
maintain a threshold associated with roaming per second events by the one or more wireless devices;
instantiate a new virtual partition for a new VLAN based at least in part on information from the one or more wireless devices indicating that the roaming per second events exceed the threshold; and
update the one or more components of the intermediate distribution frame with mapping data to utilize with new wireless devices accessing the facility and for communicating with the new virtual partition for the new VLAN.

2. The network architecture of claim 1, wherein the threshold is specified by an entity associated with the facility.

3. The network architecture of claim 1, wherein the threshold is based at least in part on historic roaming per second event information obtained from a corresponding virtual partition associated with each VLAN for a certain period of time.

4. The network architecture of claim 1, the roaming per second events including a location update from a wireless device of the one or more wireless devices to a plurality of intermediate distribution frames of the facility.

5. A computer-implemented method, comprising:
maintaining, by a computer system, a virtual partition for each wireless virtual local area network (VLAN) of a plurality of VLANs, the virtual partition configured to process mapping requests from one or more wireless devices of a particular VLAN of the VLANs, the mapping requests transmitted to and from the one or more wireless devices of the VLANs accessing a facility via wireless access points of the facility;
maintaining, by the computer system, a threshold associated with roaming per second events by the one or more wireless devices of the facility;
instantiating, by the computer system, a new virtual partition for a new VLAN based at least in part on information from the one or more wireless devices indicating that the roaming per second events exceed the threshold; and
updating, by the computer system, one or more components of an intermediate distribution frame with mapping data to utilize with new wireless devices accessing the facility and for communicating with the new virtual partition for the new VLAN.

6. The computer-implemented method of claim 5, wherein the VLANs are further maintained by one or more components of the intermediate distribution frame.

7. The computer-implemented method of claim 5, wherein a VLAN of the VLANs associated with a device type of one or more device types associated with the one or more wireless devices.

8. The computer-implemented method of claim 7, further comprising maintaining a plurality of thresholds, an individual threshold of the plurality of thresholds associated with a specific device type of the one or more device types.

9. The computer-implemented method of claim 5, the wireless access points attached to one or more egress tunnel routers.

10. The computer-implemented method of claim 5, wherein the computer system is a server computer.

11. The computer-implemented method of claim 5, wherein the virtual partition is a virtual machine instance that is instantiated by the computer system.

12. The computer-implemented method of claim 5, wherein the computer system is proximately located to a portion of the wireless access points of the facility.

13. The computer-implemented method of claim 5, wherein the virtual partition for each VLAN is associated with a unique internet protocol (IP) subnet.

14. A computer system comprising:
a memory configured to store computer-executable instructions; and
a processor in communication with the memory configured to execute the computer-executable instructions to at least:
maintain a virtual partition for each wireless virtual local area network (VLAN) of a plurality of VLANs, the virtual partition configured to process mapping requests from one or more wireless devices of a particular VLAN of the VLANs, the mapping requests transmitted to and from the one or more wireless devices of the VLANs accessing a facility via wireless access points of the facility;
maintain a threshold associated with roaming per second events by the one or more wireless devices of the facility;
instantiate a new virtual partition for a new VLAN based at least in part on information from the one or more wireless devices indicating that the roaming per second events exceed the threshold; and
update one or more components of an intermediate distribution frame with mapping data to utilize with new wireless devices accessing the facility and for communicating with the new virtual partition for the new VLAN.

15. The computer system of claim 14, wherein the one or more components include a layer two access switch, an ingress tunnel router, and an egress tunnel router.

16. The computer system of claim 14, wherein the one or more wireless devices transmit and receive location requests while moving throughout the facility.

17. The computer system of claim 14, wherein updating the one or more components includes transmitting a configuration file to the intermediate distribution frame.

18. The computer system of claim 14, wherein the new wireless devices authenticate with the intermediate distribution frame.

19. The computer system of claim 18, wherein the processor in communication with the memory is further configured to assign the new wireless devices to the new virtual partition and the new VLAN.

20. The computer system of claim 14, wherein each wireless access point of the wireless access points is attached to an egress tunnel router.

\* \* \* \* \*